United States Patent [19]
Chang et al.

[11] Patent Number: 5,978,407
[45] Date of Patent: Nov. 2, 1999

[54] COMPACT AND HIGHLY EFFICIENT LASER PUMP CAVITY

[75] Inventors: Jim J. Chang, Dublin; Isaac L. Bass, Castro Valley; Luis E. Zapata, Livermore, all of Calif.

[73] Assignee: United States Enrichment Corporation, Bethesda, Md.

[21] Appl. No.: 08/825,584

[22] Filed: Mar. 31, 1997

[51] Int. Cl.[6] .................................................. H01S 3/091
[52] U.S. Cl. .............................................. 372/72; 372/70
[58] Field of Search .................................. 372/69, 70, 72

[56] References Cited

U.S. PATENT DOCUMENTS

| | | | |
|---|---|---|---|
| 3,668,546 | 6/1972 | Schumacher | 372/72 X |
| 4,140,979 | 2/1979 | Ramer | 372/72 X |
| 4,357,704 | 11/1982 | Koechner | 372/72 |
| 4,924,474 | 5/1990 | Yagi et al. | 372/72 X |
| 5,033,058 | 7/1991 | Cabaret et al. | 372/70 X |

OTHER PUBLICATIONS

"High–power high–efficient diode–side–pumped Nd: YAG laser," Advanced Solid State Lasers, Ed. Pollock et al., *OSA Trends in Optics and Photonics Series*, vol. 10, Jan. 27–29, meeting, Optical Society of America, Washington, D.C. pp. 296–299 (Jan. 1997).

*Primary Examiner*—John D. Lee

[57] ABSTRACT

A new, compact, side-pumped laser pump cavity design which uses non-conventional optics for injection of laser-diode light into a laser pump chamber includes a plurality of elongated light concentration channels. In one embodiment, the light concentration channels are compound parabolic concentrators (CPC) which have very small exit apertures so that light will not escape from the pumping chamber and will be multiply reflected through the laser rod. This new design effectively traps the pump radiation inside the pump chamber that encloses the laser rod. It enables more uniform laser pumping and highly effective recycle of pump radiation, leading to significantly improved laser performance. This new design also effectively widens the acceptable radiation wavelength of the diodes, resulting in a more reliable laser performance with lower cost.

26 Claims, 7 Drawing Sheets

COMPACT AND HIGHLY EFFICIENT LASER PUMP CAVITY

The United States Government has rights in this invention pursuant to Contract No. W-7405-ENG-48 between the U.S. Department of Energy and the University of California.

BACKGROUND OF THE INVENTION

Solid-state lasers pumped by high-power laser diodes have been used for many years in a wide range of applications. Conventional diode-pumped solid state lasers can be classified as end-pumped and side-pumped lasers, as shown in FIGS. 7A and B.

The end-pumped configuration, depicted in FIG. 7A, usually leads to higher laser efficiency because of a better overlap between the pump beam and the laser cavity mode. At high average power levels, end pumping becomes less attractive because of the difficulty to couple a large amount of laser-diode output into the end of a laser rod, which typically has a diameter of 2–6 mm.

A side-pumped geometry, depicted in FIG. 7B, is preferred for high-power designs because of the large rod surface that can be used for radiation pumping. Conventional side-pump schemes have the disadvantage of short optical path across the diameter of the laser rod, with the consequence that a large fraction of the pump radiation is not deposited into the laser rod. This characteristic also makes side-pump lasers more sensitive to the diode radiation wavelength, which may change during the course of its lifetime. These disadvantages considerably reduce the side-pumped laser efficiency.

A problem plaguing both end-pumped and side-pumped geometries is that of inhomogeneous pumping. The side-pumped laser rod has to balance Beer's Law absorption, that tends to deposit the power near the surface closest to the emitter, against the loss of absorption efficiency encountered when a lightly doped rod is used to permit deeper penetration. In addition, diode light concentration using conventional optics such as lenses often limits the number of emitters that can be circled around the rod and requires careful design to achieve pumping homogeneity.

The end-pumped laser, using an imaging device to demagnify the emitting diode array, results in imprints of the diode array image at the end of the rod. Inside guiding curved surfaces of the rod forms a repeating sequence of these images.

Inevitably, both geometries end up with hot and cold spots. This limits the average output attainable because of wavefront distortion and depolarization.

SUMMARY OF THE INVENTION

To resolve these issues, an aspect of the present invention uses a new side-pumped scheme with a novel pump cavity configuration that improves laser performance.

According to one aspect of the invention, an elongated pumping structure oriented along a main axis includes an elongated pumping chamber and a plurality of elongated light concentration channels for coupling pumping radiation into the pumping chamber. The elongated light concentration channels are tapered with a wide entry aperture and a narrow exit aperture so that light is likely to be injected into and trapped inside the elongated pumping chamber.

According to another aspect of the invention, the light concentration channels are compound parabolic concentrators (CPC) that effectively concentrate the light entering the large entry aperture to be transmitted through the small exit aperture.

According to another aspect of the invention, the sides of the light concentration channels are reflectively coated to specularly reflect light from the sides.

According to another aspect of the invention, the walls of the pumping chamber are coated to diffusely or specularly reflect light from the walls of the pumping chamber.

According to another aspect of the invention, the pumping chamber is segmented and specially shaped so that glancing rays are more efficiently and/or more homogeneously reflected into the laser medium.

According to another aspect of the invention, the coupling structure comprises segments which are assembled to form the coupling structure. Each segment includes side surfaces which form the light concentration channels and curved inner surfaces which form the pumping chamber when the segments are assembled.

According to another aspect of the invention, a CPC is designed with a higher refractive index material (such as glass) for an improved light concentration.

According to another aspect of the invention, troughs with flat reflecting surfaces can also be applied to channel the pump light into the pump chamber. Although they are less effective in concentrating the light into the chamber, their simplicity is attractive for applications that don't require high concentration for pump light.

According to another aspect of the invention, the inside surface of the pump chamber can be either a specular or a diffuse reflector.

According to another aspect of the invention, non-diode pumping radiation sources are utilized to provide pumping radiation to entry apertures of the light concentration channels.

According to another aspect of the invention, the laser medium can be a liquid, such as dye, disposed in a cylindrical flow tube.

According to another aspect of the invention, the light channels and pump chamber may be filled with water or higher index fluid for the reduction of pump-beam divergence.

This new compact side-pump laser design with light concentrator injection of conditioned diode light effectively traps the pump radiation inside the pump chamber. It enables recycling of unused pump radiation that leads to an improved laser efficiency with high pumping homogeneity. The efficient radiation recycling also widens the acceptance wavelength bandwidth of the diode radiation, which is very important for efficient and reliable laser performance.

Other features and advantages of the invention will be apparent in view of the following detailed description and appended drawings.

DESCRIPTION OF THE PREFERRED EMBODIMENT

Figure 1A:
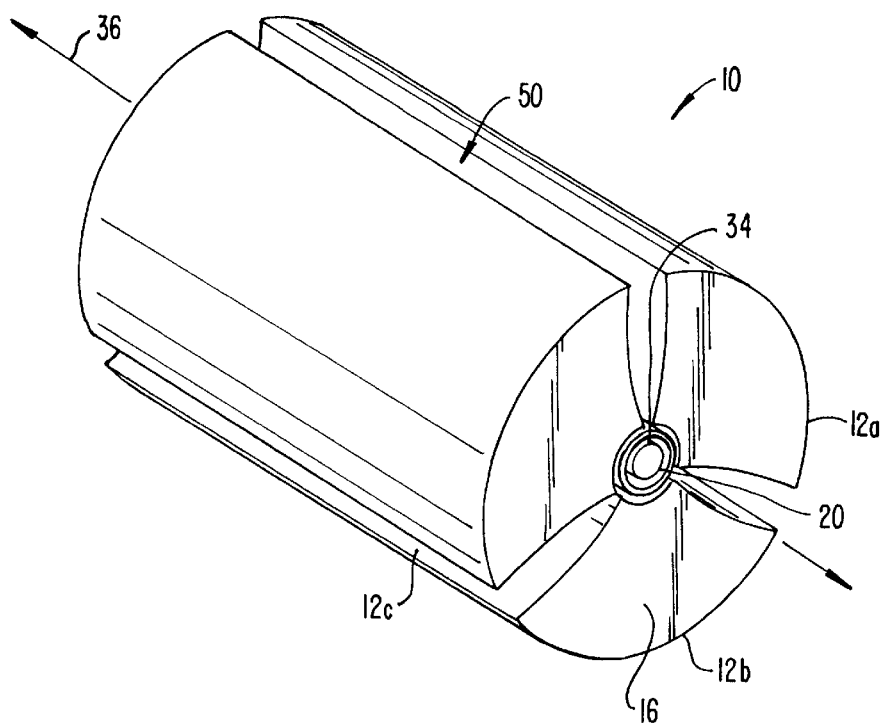
FIGS. 1A and B are, respectively, perspective, elongated views of the pump radiation coupling structure and a segment thereof.
Figure 2:
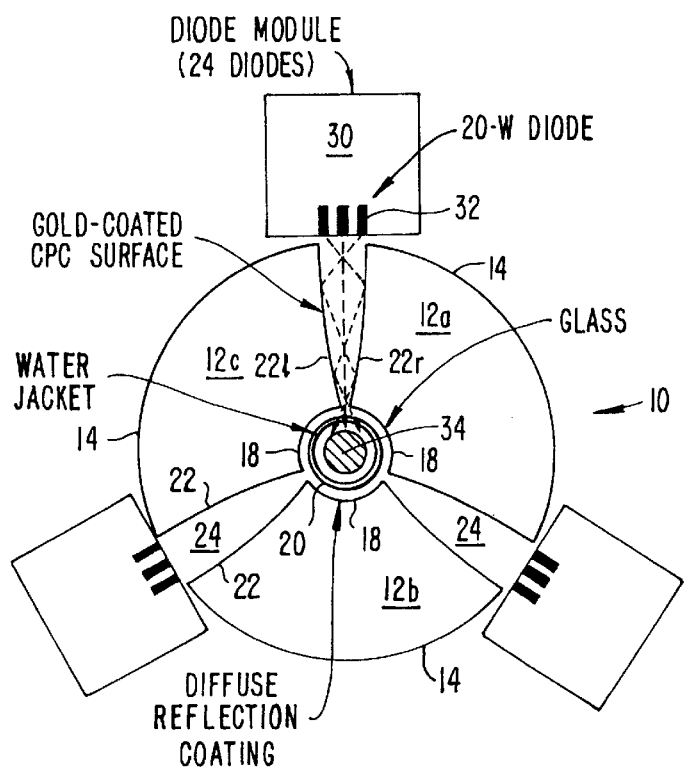
FIG. 2 is a cross-sectional view of the coupling structure.

FIGS. 1A and B are, respectively, perspective, elongated views of a preferred embodiment of the pump radiation coupling structure 10 and a segment 12 thereof. FIG. 2 is a cross-sectional view of the laser pumping structure 10. The compound parabolic concentrators (CPC) channel the pump radiation into a small pump chamber through narrow slots. A laser rod is located inside the pump chamber to receive the pump radiation. An optional flow tube is used to cool the laser rod. The pump chamber can also be flooded with water with the elimination of the flow tube. The space outside the flow tube may be filled with water, index matching fluid, or air depending on various design goals. The width of slots on the pump chamber is chosen to optimize the tradeoff between transmission of pump radiation into the pump chamber and prevention of escape once radiation has entered the pump chamber.

In the preferred embodiment, the laser pumping structure 10 is in the form of a circular cylinder comprising segments 12a, b, and c. Each segment 12 includes a curved outer surface 14 which forms part of the outer surface of the circular cylinder; first and second flat end surfaces 16 which form the base of the circular cylinder; a curved inner surface 18 which forms a part of an elongated pumping chamber 20; and left and right tapering side surfaces 22l and 22r which form the sides of an elongated pumping light concentration channels 24. Each tapering side surface has outer and inner edges 25o and 25i.

Each pumping light concentration channel has an input aperture 26 and an exit aperture 28. In a preferred embodiment, the source of pumping radiation is a laser-diode module 30. The laser diodes 32 in the module 30 are oriented to output radiation into the input aperture 26 of an associated pumping light concentration channel 24 and are disposed along the full length of each light concentration channel 24. The lasing medium is a cylindrical laser medium 34, which can be a solid-state laser rod, a liquid dye, or a gas laser. In the currently preferred embodiment the laser medium is a solid-state laser rod. The composition of the laser rod 34 will be described below. An elongated axis 36 of the laser rod forms the central axis to the circular cylinder forming the pumping structure.

Figure 3A:
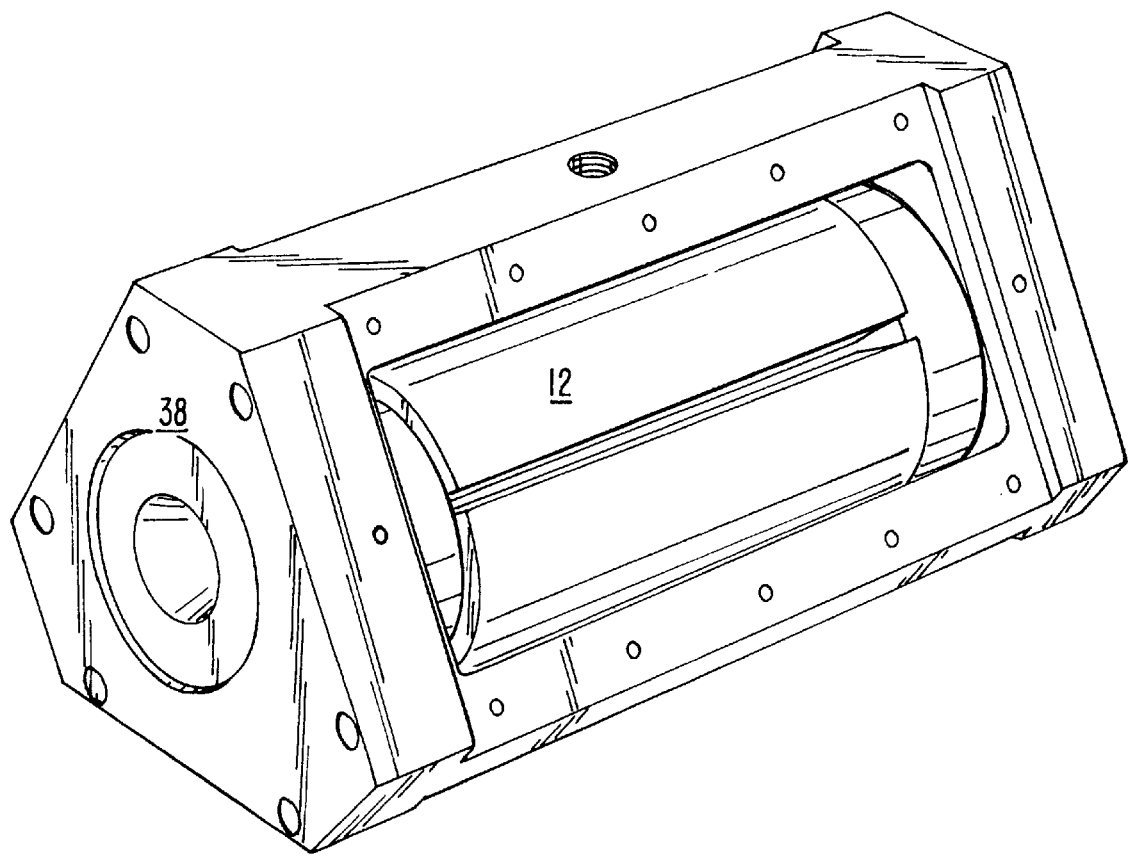
FIG. 3A is a perspective view of the cylindrical coupling structure mounted in a frame that holds the diode arrays.
Figure 3B:
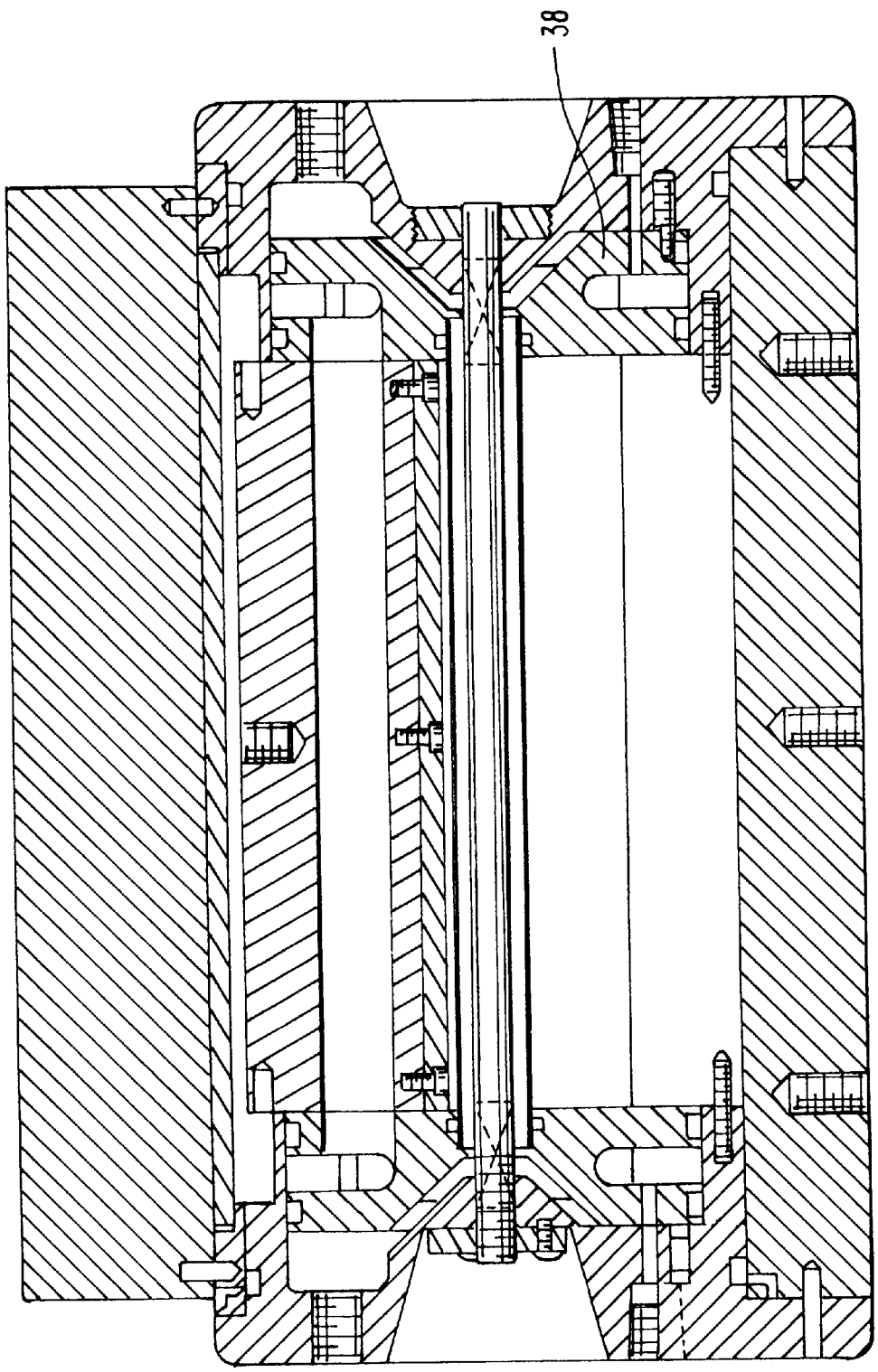
FIG. 3B is a cross-sectional view of the mounted cylindrical coupling structure.

FIG. 3A is a perspective view of the cylindrical coupling structure mounted in a frame that holds the diode arrays and FIG. 3B is a lengthwise cross-sectional view thereof.

The segments 12 are held in position by an endpiece 38. The three inner surfaces 18 of the segments 12 form an elongated pumping chamber, having a circular cross section and oriented colinearly to the elongated axis of the cylindrical laser rod 34. When the segments are assembled the tapered side surfaces 22 form tapered light concentration channels 24, with the outer edges 25o of the side surfaces separated to form an input slot and the inner edges 25i separated to form an output slot. In a first preferred embodiment, the light concentration channels 24 are in the form of compound parabolic concentrators (CPC) which are oriented parallel to the elongated axis 36 of the cylindrical rod 34.

Figure 4A:
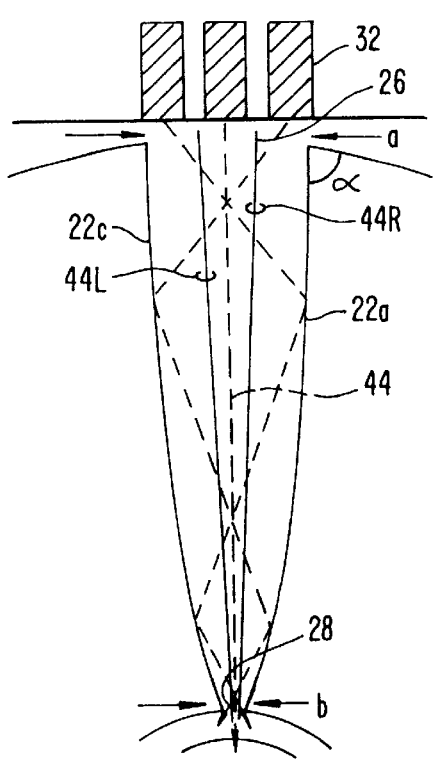
FIG. 4A is a more detailed depiction of a light concentration channel 24 in the form of a parabolic concentrator.

FIG. 4A is a more detailed depiction of a light concentration channel 24 in the form of a CPC. The CPC output slot width b, in the 2-dimensional analysis, has a theoretical minimum expressed as $$b = a \sin v/n,$$

where n is the refractive index of the medium in the volume of the CPC (i.e., n=1 for air and n=1.3 for water), a is the dimension of the CPC input slot width, and v is the beam divergence of the laser-diode radiation that enters the CPC. The surface of the CPC has a high-reflectivity coating to minimize its transmission loss.

The theory of CPC operation is well-known and is set forth, for example, in the book entitled "High Collection Non-Imaging Optics," by Welford & Winstorn, Academic Press. Therefore, only a brief description will be set forth herein. The side surfaces of the segments are shaped as parabolas to control light concentration. In FIG. 4A, the CPC light concentration channel 12 has a vertical axis 44. The right surface of the CPC light concentration channel is a parabola symmetric about a right axis 44R tilted slightly clockwise from the vertical axis 44, having a focus located near the left side of the exit aperture 28. Similarly, the left surface of the CPC light concentration channel is a parabola symmetric about a left axis 44L, tilted slightly counter-clockwise from the vertical axis 44 and having a focus located near the right side of the exit aperture 28.

Figure 4B:
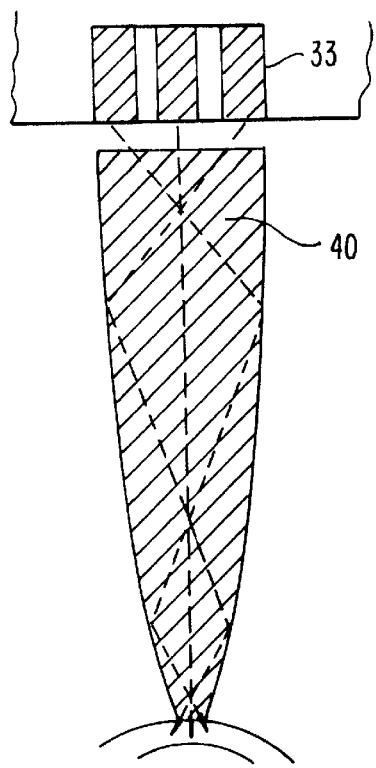
FIG. 4B is a detailed depiction of a parabolic light concentration channel made from material with higher refractive index material such as glass.

FIG. 4B depicts a light concentration channel made of solid, transparent materials 40, such as glass or fused silica, receiving light from a pump radiation source 33.

Figure 4C:
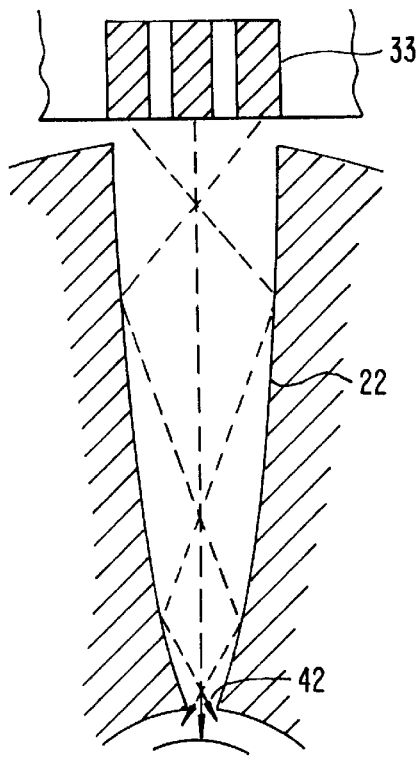
FIG. 4C is a detailed depiction of a light concentration channel having flat and tapered side walls (trough)

FIG. 4C depicts a second alternative configuration of a light concentration channel, having flat side walls 22. Light concentration channels having side walls with segments formed as parabolic sections or flat sections may also be utilized.

Figure 1B:
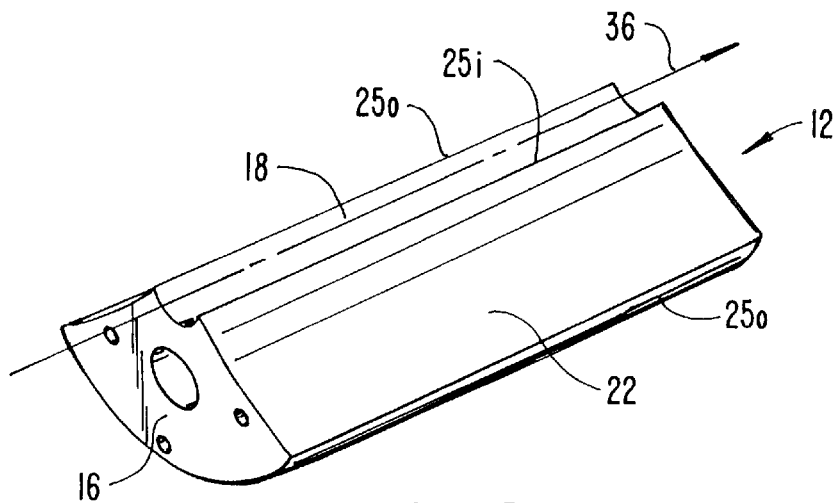

Referring back to FIGS. 1A, 1B, and 2, the CPC input aperture 26 forms an elongated input slot 50 of the elongated light concentration channel 24 and the CPC output aperture 28 forms an elongated output slot of the light concentration channel 24. Because the exit apertures 28 are narrow, the pumping light is effectively both trapped and multiply reflected inside the pumping chamber so that light passing through the laser rod is reflected through the rod multiple times and recycled. The exit apertures 28 comprise less than 4% of the total circumference of the pumping chamber 20. This recycling of unused pump radiation leads to an improved laser efficiency with high pumping homogeneity. The efficient radiation recycling also widens the acceptance wavelength bandwidth of the diode radiation, which is very important for reliable laser performance.

Experimental results have demonstrated a dramatic increase in power compared with prior art side-pumped solid state lasers.

In a preferred embodiment, the curved inner surfaces 18 and curved side surfaces 22 are reflectively coated with gold or other highly reflective coatings such as silver or dielectric coatings. The side surfaces 22 are polished and coated to specularly reflect pumping radiation. The inner surfaces 18 are preferably coated to diffusely reflect pumping radiation, for reasons described more fully below.

Figure 5A:
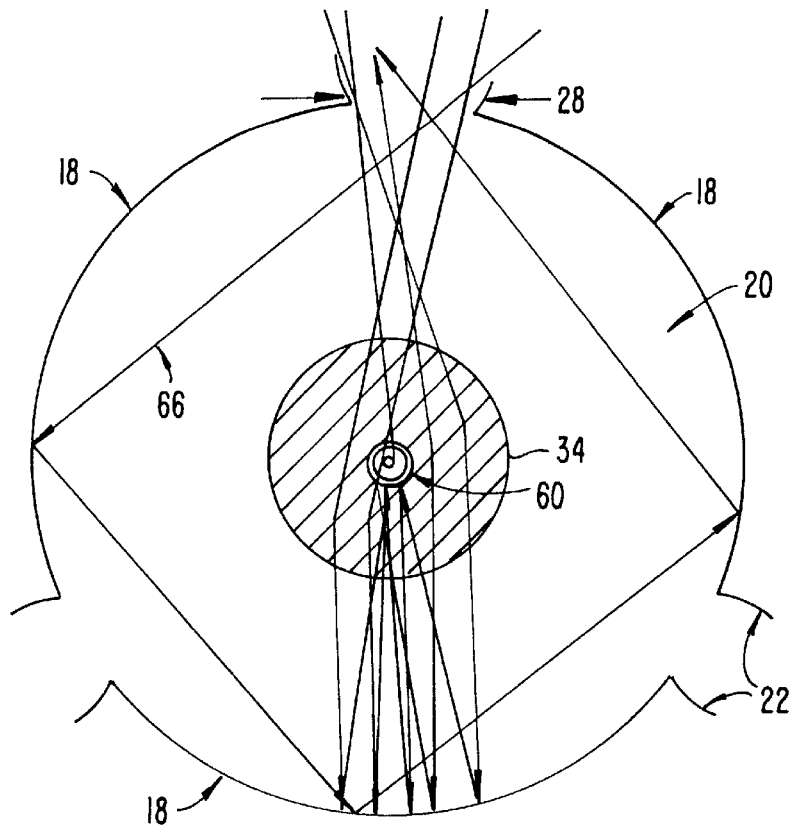
FIG. 5A is a cross-sectional view depicting the operation of a pumping cavity coated so that rays are specularly reflected from the surface.

FIG. 5A depicts the operation of a pumping chamber 20, coated so that rays are specularly reflected from the surface. The laser rod 34 has a circular cross-section which acts as a lens to collimate the divergent rays entering through the exit aperture 28. The circular surface of the pumping chamber 20 focuses those rays to a small area in the rod to form a hot spot 60 of pump radiation in the laser rod 34. This would then lead to an undesirable hot spot in the laser beam produced by the rod. Accordingly, it is generally preferable to coat the inside chamber to diffusely reflect the rays so that rays passing through the rod are not refocused to a hot spot.

FIG. 5A also depicts a glancing ray 66 that reflects around the surface of the pumping chamber 20 and never enters the rod 34. The amount of the total pumping energy carried by these glancing rays is a small fraction of the total, but still represents an inefficiency in the pumping process.

Figure 5B:
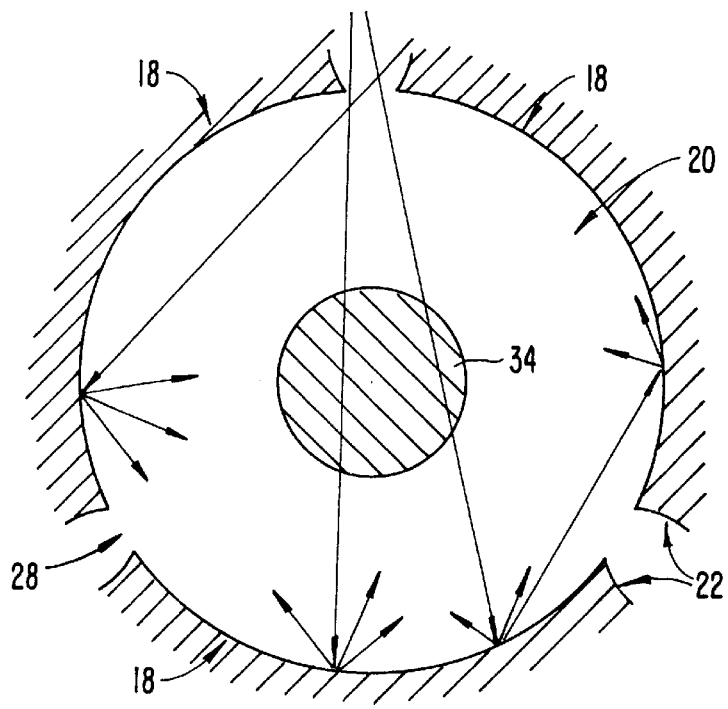
FIG. 5B is a cross-sectional view depicting the operation of a pumping cavity coated so that rays are diffusely reflected from the surface.

FIG. 5B depicts the use of a pump chamber with diffused reflectors 18. The highly diffused reflection of pump light avoids the problem of forming hot pumping spots in the laser rod, resulting in a more uniformed laser pumping and higher laser efficiency.

Figure 6A:
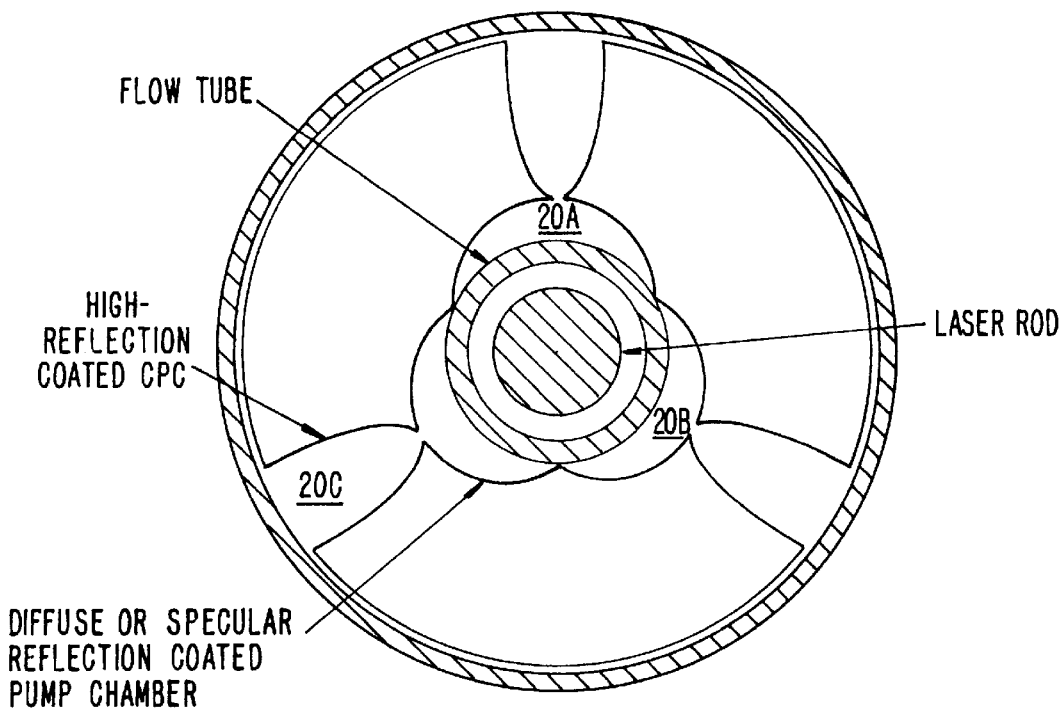
FIGS. 6A and 6B are cross-sectional views depicting alternate configurations of the pumping chamber 20 that assure that glancing rays will be reflected into the lasing rod 34.
Figure 6B:
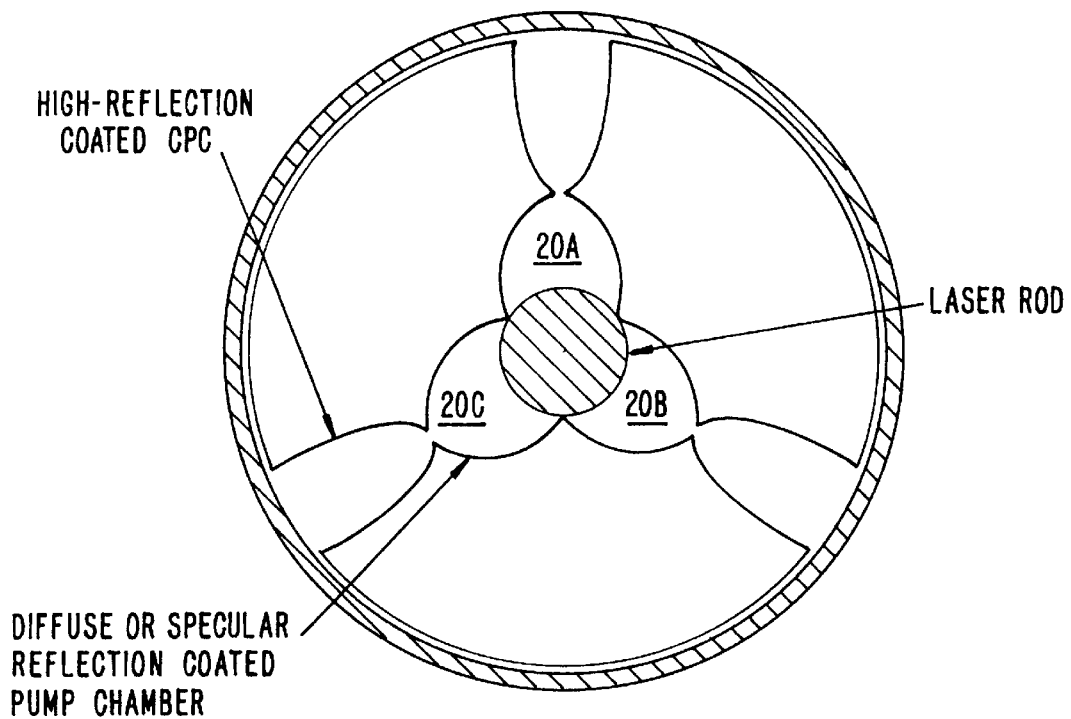
Figure 7A:
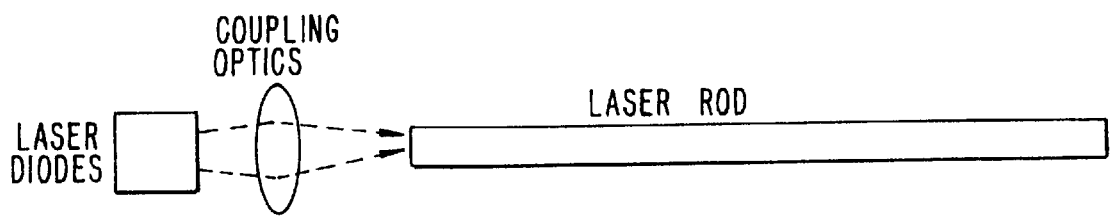
FIGS. 7A and 7B are views of prior art end-pumped and side-pumped lasers.
Figure 7B:
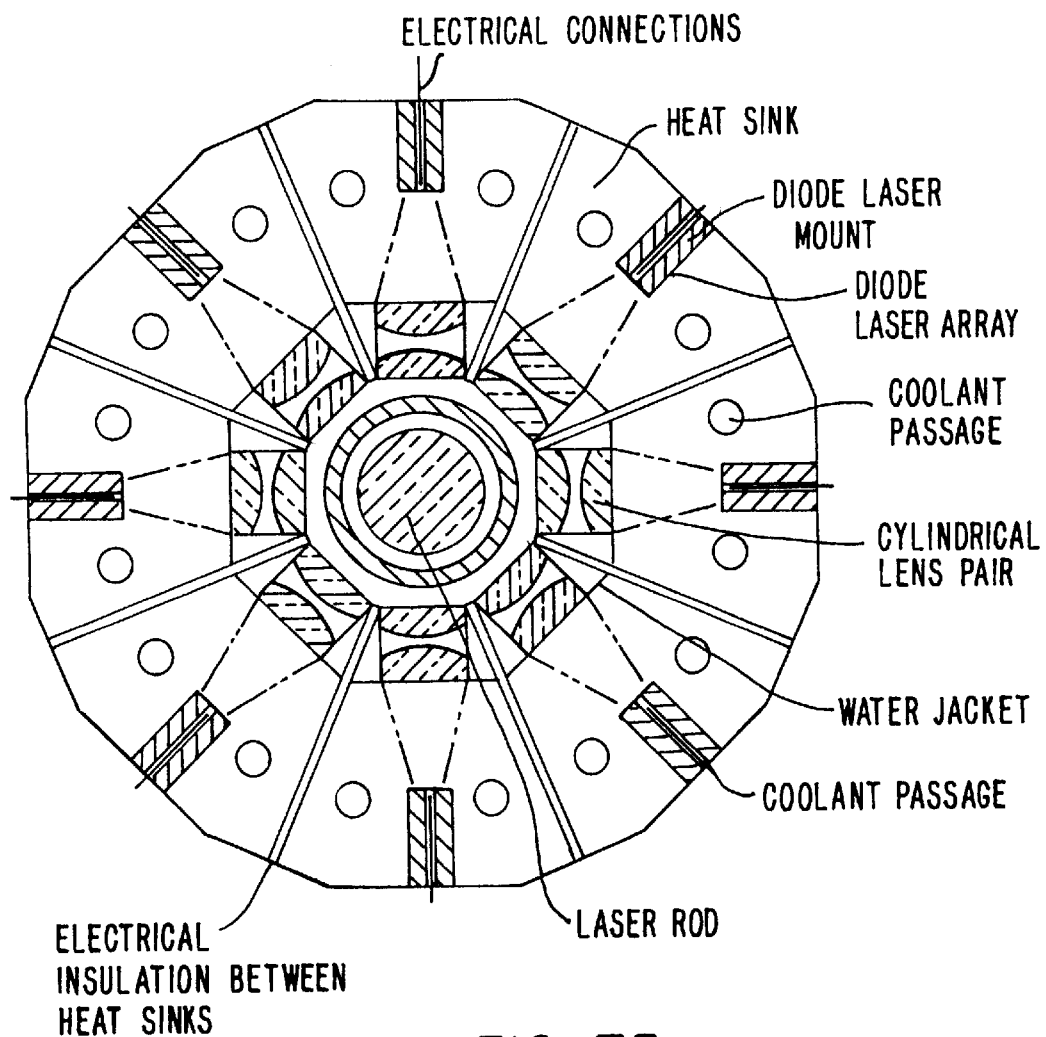

FIGS. 6A and 6B depict alternate configurations of the pumping chamber 20 that assure the glancing rays will be reflected into the lasing rod 34. In FIGS. 6A and B, the pumping chamber is divided into three sections 20A, 20B, and 20C. There is no path that allows a glancing ray to traverse the pumping chamber 20 without being reflected into the lasing rod 34.

Although the above description is of an embodiment having three light concentration channels, the number of channels is variable and is determined by the geometry and dimensions of the pumping array, lasing rod, and footprint of the laser.

In the above-described embodiment a diode array is utilized as a source of pumping radiation. However, other pumping sources such as a laser can be utilized, as is well-known in the art.

Suitable materials and pumping wavelengths for the lasing rods include, but are not limited to, Nd:YAG at 808 nm, YB:YAG at 940 nm, Nd:YLF at 805 nm, and liquid dye laser pumped by visible light.

The invention has now been described with reference to the preferred embodiments. Alternatives and substitutions will now be apparent to persons of skill in the art. The light concentration channels and pump chamber may be filled with water or higher index fluid for the reduction of pump-beam divergence. The side-pumped configuration will yield increased efficiency compared to prior art configurations. Accordingly, it is not intended to limit the invention except as provided by the appended claims.

What is claimed is:

1. A laser pumping structure for use in a laser system having an elongated lasing medium oriented along a main axis, with the pumping structure for coupling pumping radiation from a pumping source, said laser pumping structure comprising:

an elongated pumping chamber, having a plurality of exit slots for transmitting pumping radiation into said pumping chamber and a plurality of reflecting surfaces, for substantially surrounding said elongated lasing medium to reflect pumping radiation into the elongated lasing medium, with the area of said reflecting surfaces being much greater that the area of said exit slots so that pumping radiation is multiply reflected from said reflecting surfaces to recycle pumping radiation and improve pumping efficiency; and a plurality of elongated light concentration channels oriented along a main axis, each light concentration channel having reflective side walls, an entry slot, and terminated by one of said exit slots, with said entry slots for receiving pumping radiation, with each light concentration channel having a tapered cross-section with the entry slot being substantially wider than the exit slot so that pumping radiation from a wide source with a large beam divergence can be transmitted into said elongated pumping chamber through said smaller exit slots.

2. The laser pumping structure of claim 1 wherein:

each elongated light concentration channel has first and second side reflective side walls, with the first and second reflective side walls being parabolic in shape so that the elongated light concentration channels are compound parabolic concentrators.

3. The laser pumping structure of claim 1 wherein:

each elongated light concentration channel has first and second side walls which are flat so that the elongated light concentration channels are tapered troughs which concentrate pumping light channeled into the pumping chamber.

4. The laser pumping structure of claim 1 wherein:

each elongated light concentration channel is filled with liquid transparent material for improved light concentration into the pumping chamber.

5. The laser pumping structure of claim 1 wherein:

each elongated light concentration channel is made from solid transparent material for improved light concentration into the pumping chamber.

6. The laser pumping structure of claim 1 wherein:

said pumping chamber is formed in a plurality of segments so that glancing rays are reflected into the lasing medium.

7. The laser pumping structure of claim 1 wherein:

said elongated lasing medium is a solid-state rod.

8. The laser pumping structure of claim 1 wherein:

said elongated lasing medium is an elongated flow tube filled with a liquid (dye) lasing substance.

9. The laser pumping structure of claim 1 wherein:

said elongated lasing medium is an elongated tube filled with a gaseous lasing substance.

10. The apparatus of claim 1 where each said reflective surface is a specular reflective surface.

11. The apparatus of claim 1 where each said reflective surface is a diffuse reflective surface.

12. A laser pumping structure for use in a laser system having an elongated solid-state lasing medium oriented along a main axis, said laser pumping structure comprising:

a plurality of elongated segments, each having an outside surface, a curved inside surface, first and second end surfaces, and left and right tapered side surfaces, each tapered side surface having inside and outside edges; and means, coupled to the end surfaces of said elongated segments, for mounting said elongated segments about a main axis to form an elongated coupling structure, with the inner surfaces of said elongated segments forming a pumping chamber in said elongated coupling structure, the left and right side surfaces of adjacent elongated segments forming parabolic light concentrators, having a tapered cross section, in said elongated coupling structure, with said light concentrator for channeling pumping light into the pumping chamber, where the outside edges of the side surfaces of adjacent segments are separated to form an entry slot of a light concentration channel in said elongated coupling structure and the inside edges are separated to form an exit slot of a light concentration channel in said elongated coupling structure.

13. The laser pumping structure of claim 12 wherein:

the tapered side surfaces of said elongated segments are parabolic and the light concentration channels are compound parabolic concentrators with the width of the exit slot substantially smaller than the width of the entry slot so that pumping light is multiply reflected in the pumping chamber to enhance the efficiency of the coupling structure.

14. The laser pumping structure of claim 12 wherein:

the tapered side surfaces of said segments are flat and the light concentration channels are tapered troughs with the width of the exit slot substantially smaller than the width of the entry slot so that pumping light is multiply reflected in the pumping chamber to enhance the efficiency of the coupling structure.

15. The laser pumping structure of claim 12 wherein:

each elongated light concentration channel is filled with liquid transparent material for improved light concentration into the pumping chamber.

16. The laser pumping structure of claim 12 wherein:

each elongated light concentration channel is made from solid transparent material for improved light concentration into the pumping chamber.

17. The laser pumping structure of claim 12 wherein:

the tapered side surfaces of said segments include a plurality of sections of different shape.

18. The apparatus of claim 4 or 15 where said liquid transparent material is water.

19. The apparatus of claim 4 or 15 where said liquid transparent material is high index fluid.

20. The apparatus of claim 5 or 16 where said solid transparent material is quartz.

21. The apparatus of claim 5 or 16 where said solid transparent material is glass.

22. A laser system comprising:

an elongated lasing medium having a main axis;

an elongated pumping chamber having a specular or diffused reflecting surface for substantially surrounding said elongated lasing medium to reflect pumping radiation into the elongated lasing medium;

a plurality of elongated light concentration channels oriented along a main axis, each having an entry slot characterized by an entry slot width and an exit slot characterized by an exit slot width, with the entry and exit slots oriented substantially parallel to a main axis, with said exit slots for coupling pumping radiation into said pumping chamber and said entry slots for receiving pumping radiation, with each light concentration channel having a tapered cross-section with the entry slot being substantially wider than the exit slot so that light channeled into the pumping chamber will not escape through the exit slots and will be multiply reflected by the inner surface of the pumping chamber.

23. The laser pumping structure of claim 22 wherein:

said elongated lasing medium is a solid-state rod.

24. The laser pumping structure of claim 22 wherein:

said elongated lasing medium is an elongated flow tube filled with a liquid (dye) lasing substance.

25. The laser pumping structure of claim 22 wherein:

said elongated lasing medium is an elongated tube filled with a gaseous lasing substance.

26. A laser, pumped by pumping radiation sources, with the pumping radiation sources transmitting radiation through an output aperture of the pumping radiation source, said laser comprising:

an elongated cylindrical lasing medium;

an elongated pumping chamber, surrounding said lasing medium and having a reflective inner surface and a plurality of exit slots having a slot area being substantially smaller than a reflective area of the reflective inner surface of said elongated pumping chamber, the pumping chamber for recycling pumping radiation transmitted through said exit slots; and means, oriented to receive radiation from the output apertures of the pumping radiation sources, for concentrating radiation from pumping sources having output apertures substantially wider than said exit slots so that pumping radiation emitted by said pumping sources is transmitted into said pumping chamber through said exit slots.

* * * * *